United States Patent
Stauder et al.

(10) Patent No.: US 8,510,676 B2
(45) Date of Patent: Aug. 13, 2013

(54) METHOD AND DEVICE FOR CREATING SEMANTIC BROWSING OPTIONS

(75) Inventors: Jürgen Stauder, Montreuil/Ille (FR); Loic Nunez, Montfavet (FR); Bertrand Chupeau, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 780 days.

(21) Appl. No.: 10/515,534

(22) PCT Filed: May 23, 2003

(86) PCT No.: PCT/EP03/05506
§ 371 (c)(1),
(2), (4) Date: Nov. 23, 2004

(87) PCT Pub. No.: WO03/103266
PCT Pub. Date: Dec. 11, 2003

(65) Prior Publication Data
US 2005/0246336 A1    Nov. 3, 2005

(30) Foreign Application Priority Data

May 30, 2002  (EP) .................................. 02291324

(51) Int. Cl.
*G06F 7/00* (2006.01)
*G06F 17/30* (2006.01)

(52) U.S. Cl.
USPC ......................................... 715/825; 715/838

(58) Field of Classification Search
USPC ........................................................ 715/810
See application file for complete search history.

(56) References Cited

U.S. PATENT DOCUMENTS 5,493,677 A * 2/1996 Balogh et al. .............. 707/104.1
5,696,964 A * 12/1997 Cox et al. .......................... 707/5

(Continued)

FOREIGN PATENT DOCUMENTS

| EP | 1209589 | 5/2002 |
| JP | 11213000 | 8/1999 |
| JP | 11296528 | 10/1999 |
| WO | WO 02/19137 | 3/2002 |

OTHER PUBLICATIONS

J. Vendrig et al.: "Filter Image Browsing—Interactive Image Retrieval by Using Database Overviews", Intelligent Sensory Information Systems, Technical Report Series, No. 5, 1998, pp. 1-61.

(Continued)

*Primary Examiner* — Daeho Song
(74) *Attorney, Agent, or Firm* — Robert D. Shedd; Jerome G. Schaefer

(57) ABSTRACT

The invention concerns a device for creating semantic browsing options comprising
- a means to select an initial set of images from an input database comprising a plurality of images, each image being associated with a semantic information out of a semantic information space,
- a means to determine a semantic information sub-space represented by the semantic information associated with said initial set of images, The device comprises also:
- a means to select a reduced sub-space out of said sub-space,
- a means to create semantic links to images of the database associated with the semantic information of said reduced sub-space,
- a means to display at least one image of the database associated with the semantic information of said reduced sub-space.

16 Claims, 2 Drawing Sheets

(56) References Cited

U.S. PATENT DOCUMENTS

| | | | |
|---|---|---|---|
| 5,761,655 A * | 6/1998 | Hoffman | 1/1 |
| 5,983,237 A | 11/1999 | Jain et al. | |
| 6,240,410 B1 | 5/2001 | Wical | |
| 6,335,742 B1 * | 1/2002 | Takemoto | 715/781 |
| 6,615,141 B1 * | 9/2003 | Sabry et al. | 702/19 |
| 6,810,149 B1 * | 10/2004 | Squilla et al. | 382/224 |
| 7,185,283 B1 * | 2/2007 | Takahashi | 715/723 |
| 7,356,530 B2 * | 4/2008 | Kim et al. | 707/709 |
| 2002/0038299 A1 * | 3/2002 | Zernik et al. | 707/3 |
| 2002/0065813 A1 * | 5/2002 | Scanlon et al. | 707/3 |
| 2002/0107973 A1 * | 8/2002 | Lennon et al. | 709/231 |
| 2002/0167538 A1 * | 11/2002 | Bhetanabhotla | 345/700 |
| 2002/0174120 A1 * | 11/2002 | Zhang et al. | 707/7 |
| 2004/0049486 A1 * | 3/2004 | Scanlon et al. | 707/1 |

OTHER PUBLICATIONS

R.C. Veltkamp, M. Tanase: "Content-Based Image Retrieval Systems: A Survey", Technical Reports, No. UU-CS-2000-34, Oct. 2000, whole document.

Search Report Dated Nov. 7, 2003.

* cited by examiner

METHOD AND DEVICE FOR CREATING SEMANTIC BROWSING OPTIONS

This application claims the benefit, under 35 U.S.C. §365 of International Application PCT/EP03/05506, filed May 23, 2003, which was published in accordance with PCT Article 21(2) on Dec. 11, 2003 in English and which claims the benefit of European patent application No. 02291324.8, filed May 30, 2002.

The invention concerns a method and a device for creating semantic browsing options.

BACKGROUND OF THE INVENTION

Driven by the digitalization in the consumer video and photo market as well as by the increasing capacity of re-writable storage devices such as hard discs and DVD, the problem of digital asset management drifts from the professional to the consumer market.

One of the challenges of video and photo asset management is to gather semantic information from the media in order to allow for easy data access. In the professional market, first products propose semantic access.

This invention addresses the problem of semantic access to personal video and photo assets for the consumer market.

Known consumer tools for image browsing are usually based on available metadata such as date of digitalization and film number, or based on manually added keywords and annotations such as source/author or place/time. The first type of metadata allows only for poor browsing capabilities while the second type of metadata needs to be inserted manually and the resulting browsing capabilities depend heavily on metadata quality and quantity.

One solution to raise the performance of consumer tools for image browsing is to add automatically identified semantic elements such as "persons", "indoor scene" or "mountains" as known from very recent professional tools. But such a core solution is not adapted to inexperienced users of consumer electronic products. In this market, image access is not always guided by a clear objective or a predefined workflow. A professional user may look precisely for an image of a person in an indoor scene, while an inexperienced user may look initially for the photo of a person and, after having seen the photos of some persons, may look for mountain images because these persons recall him the memory of a mountain trip. Like "zapping" for TV watching, the user perceives video and photo browsing as divertissement. Initial browsing objectives are changed while browsing.

BRIEF SUMMARY OF THE INVENTION

This invention concerns a new device to propose semantic browsing options to the user in an easily understandable, visual manner.

The invention concerns a device for creating semantic browsing options comprising
- a means to select an initial set of images from an input database comprising a plurality of images, each image being associated with a semantic information out of a semantic information space,
- a means to determine a semantic information sub-space represented by the semantic information associated with said initial set of images, According to the invention, the device comprises:
- a means to select a reduced sub-space out of said sub-space,
- a means to create semantic links to images of the database associated with the semantic information of said reduced sub-space,
- a means to display at least one image of the database associated with the semantic information of said reduced sub-space.

Instead of proposing explicitly to browse images of "persons", images of "indoor scenes", or "mountain" images, such browsing options are represented and displayed by an automatic selection of images that each are representative for a certain semantic class such as "persons", "indoor" or "mountain".

These browsing options are proposed to the user in a visual, implicit manner represented by images such that the user can follow the options without explicit selecting of a semantic class, a category or a theme. Such a device can be of a considerable interest in browsing images which content is not known, and is particularly convenient when looking at images only for pleasure without any precise aim.

In a preferred embodiment, the means to select an initial set of images can be chosen among
- a fixed burned-in selection,
- a random selection,
- a systematic selection representing the database content,
- an interactive selection using a graphical user interface,
- a selection that considers a user profile.

Thus the user can act on the initial set of images, for instance if he wants to have a look at images related to a particular theme, or according to his profile. He can for instance give as input his personal preferences, hobbies.

These different modes can be choices in the same application and the user can select one of these modes by selecting a button for instance.

In a preferred embodiment, the input database is chosen among a set of still images, a set of images extracted from at least one video sequence, and a set of images received through a communication link.

In a preferred embodiment, the means to select a reduced sub-space out of said sub-space are intended to select said reduced sub-space according to a predetermined criterion.

The predetermined criterion can be dominant labels for instance. This criterion, in a particular embodiment, can be fixed in time or adaptive.

This criterion can be selected by the user for instance.

In a preferred embodiment, the means to select a reduced sub-space out of said sub-space are intended to select said reduced sub-space according to a predetermined criterion chosen according to a user profile.

The user can, for instance, enter its particular preferences or wishes at any time or once.

In a preferred embodiment, the means to select a reduced sub-space out of said sub-space are intended to modify said predetermined criterion upon interaction of a user.

In a preferred embodiment, the user interaction consists in selecting at least one of the images of the initial set of images and in that the means to select a reduced sub-space are intended to select a reduced sub-space represented by the semantic information associated with said selected images.

Such an embodiment enables an interaction with the user and the device does not behave completely automatically without the input of the user.

The user can indicate preferences by selecting images, for instance images relative to a certain theme or to certain persons.

Instead of proposing explicitly to indicate search keywords such as "persons", "indoor scenes", or "mountain", the user can click on a number of images that correspond to what he is looking for. To ensure the functionality of the search function, the system associates semantic labels such as "persons" or "indoor" automatically to the images of the database.

By clicking on images, the user can be exposed to a visual excitation instead of a reasonable class name. Furthermore, subjective associations that may have nothing in common with the semantic class can stimulate the user to click on an image.

In a preferred embodiment, the user interaction consists in selecting at least one of the images of the initial set of images and in that the means to select a reduced sub-space are intended to select a reduced sub-space represented by the semantic information associated with the initial set of images minus the semantic information associated with the selected images.

Instead of indicating its preferences, the user can select the images he does not want to display. This can be particularly interesting when the user has some wishes but cannot find in the initial set of images, the images he would like to browse.

In a preferred embodiment, the means to select a reduced sub-space out of said sub-space are intended to select said reduced sub-space by a method selected out of a cluster analysis, a principal component analysis and an histogram analysis of the semantic information of said sub-space.

Such means enable to analyze the semantic information associated with the images of the initial set of images. Thanks to this analysis, a reduced sub-space of semantic information is created. A new set of images associated with the semantic information of the reduced sub-space is created.

In a preferred embodiment, entities chosen among labels of semantic classes, words and word combinations define the semantic information space.

In a preferred embodiment, the reduced sub-space contains at least one dimension of said semantic information sub-space, and the device according to this embodiment comprises
  means to choose at least one of the dimensions of said sub-space,
  means to select for each chosen dimension at least one image of the database where the associated semantic information of this image is strong in the chosen dimension.

In a preferred embodiment, the means to select a reduced sub-space out of said sub-space are intended to use a semantic graph that contains semantic links between the dimensions of the semantic information space.

In a preferred embodiment, the means to select a reduced sub-space out of said sub-space are intended to set-up the semantic graph using an information structuring chosen among a semantic structure, an ontology, a grammar and other language related knowledge.

In a preferred embodiment, the means to display at least one image of the database associated with the semantic information of said reduced sub-space are intended to display the images in the form of image buttons, where each image button offers a browsing option for images of the database of which associated semantic information is strong in the same dimension as that one associated with the image button.

This kind of presentation is called image buttons. Instead of deciding for an explicitly indicated semantic class, the inexperienced user decides for a concrete image that seems to him interesting.

The users selection can be based on more than only the name of a semantic class of images. By displaying an image button, the user is exposed to a visual excitation instead of a reasonable class name. Furthermore, subjective associations that may have nothing in common with the semantic class can stimulate the user to choose the browsing option represented by an image button.

An interesting feature of such a system is also that errors in the automatic selection of image buttons are not visible. If, for example by error, an "indoor" image is displayed as image button for "mountain" images, the error is not obvious, since the user does not expect a "mountain" image button. Furthermore, even an erroneously chosen image for an image button can stimulate the user as explained here before.

In a preferred embodiment, the selected initial set of images and the images of the database associated with the semantic information of said reduced sub-space are displayed simultaneously using at least two windows of a display.

In a preferred embodiment, the selected initial set of images is replaced by the images of the database associated with the semantic information of said reduced sub-space.

The invention concerns also a method for creating semantic browsing options comprising the steps of:
  selecting an initial set of images from an input database comprising a plurality of images, each image being associated with a semantic information out of a semantic information space,
  determining a semantic information sub-space represented by the semantic information associated with said initial set of images, characterized in that it further comprises the steps of
  selecting a reduced sub-space out of said sub-space,
  creating semantic links to images of the database associated with the semantic information of said reduced sub-space,
  displaying at least one image of the database associated with the semantic information of said reduced sub-space,
  said method being preferably intended to be implemented in any embodiment of a device according to the invention.

The invention concerns also a computer program product comprising program instructions for executing the steps of the method for creating semantic browsing options according to the invention, when said program is loaded on a computer.

BRIEF DESCRIPTION OF THE DRAWINGS

Other characteristics and advantages of the invention will appear through the description of a non-limiting embodiment of the invention, which will be illustrated, with the help of the enclosed drawing.

DETAILED DESCRIPTION OF THE INVENTION

Figure 1:
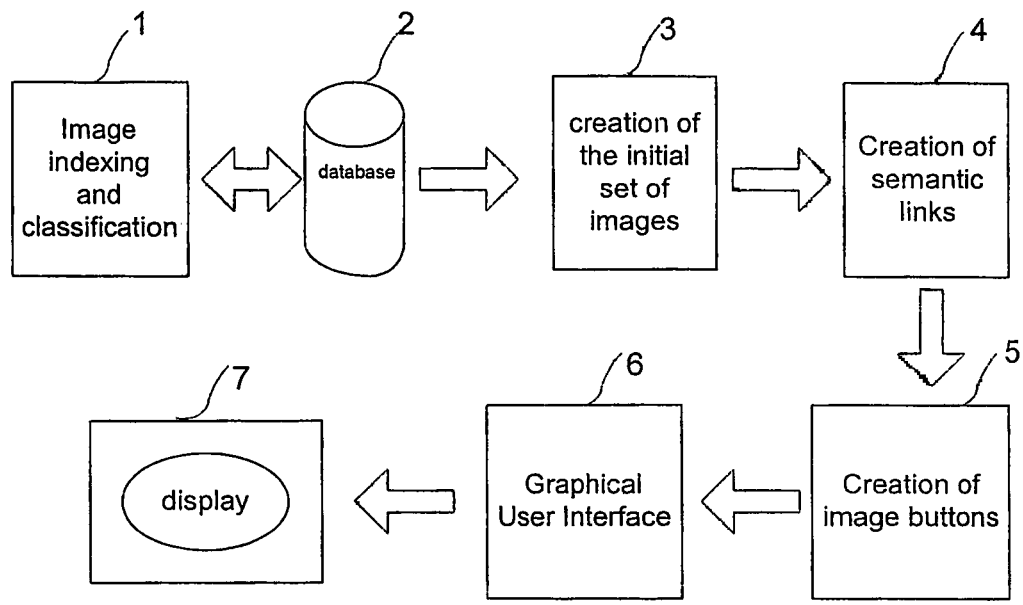
FIG. 1 represents a system implementing an embodiment of the invention.

An image indexing and classification means 1 is connected to a database 2. The database contains still images and textural metadata.

The database 2 can store still images and video images or a set of images received through a communication link. The database may be distributed for example in a network. The database may consist of two databases, one for the images, and one for the metadata.

The metadata can be of various types. It can be free text delivered with the images. The metadata can be manually edited keywords. The metadata can contain semantic class labels such as "indoor", "outdoor", "people", "mountain", or "city" that are generated offline or online by the indexing and classification means 1. More than one class label may be associated to one image. The metadata can be coded, for example into class label numbers. The term semantic information is used later in this document to represent the metadata.

The image indexing and classification means is in charge of associating semantic information with the data stored in the database 2.

The semantic information associated with the data stored in the database represent a semantic information space.

The semantic information labels of semantic classes or words or word combinations define the semantic information space.

The database 2 is also connected to a module 3 enabling the creation of an initial set of images. The creation of initial set of images module 3 enables the selection of an initial set of images out of the database.

In a preferred embodiment, the creation of initial set of images module 3 can be an automatic selection of images of the database 2. In this case, the selection can be a random selection for instance. This is transparent for the user.

In a variant, this creation of initial set of images module 3 can be implemented in a user interface enabling a user to select some images of the database 2. This user interface can be a well-known interface where the images of the database are displayed and the user selects some of the images thanks to a mouse or a keypad. Said display of images can also be organized into groups or directories of images to handle a larger number of images. In this case the initial selection can be a group or a directory of images.

In another variant, the selection can be semi-automatic; it means the user can select some image themes by indicating keywords.

The semantic information associated with the selected data called the initial set of data, represent a sub-space of semantic information of the whole semantic information space of the database.

A module 4 of creation of semantic links is connected with the creation of initial set of images module 3.

This module selects a reduced sub-space out of the sub-space.

In order to select the reduced sub-space, this module can use several methods.

In a first embodiment, this module can make a cluster analysis of the semantic information associated with said sub-space.

The cluster analysis is carried out in the discrete space of words contained in the semantic information. The clusters can be found by calculation of histograms made on single words or word combinations.

A preprocessing can also be used, such as stemming and elimination of irrelevant elements.

Dominant words or dominant word combinations are extracted from the histograms. This extraction can be guided by a graph describing the structure of semantic information. The graph can be hierarchical in case of semantic information consisting of hierarchical class labels. In a variant, the graph can contain no link in case of distinct class labels without any mutual semantic covering.

If the semantic information contains free text, the graph may represent semantic links between words and/or word combinations. The finally extracted words and/or word combinations define the dimensions of the reduced information sub-space.

This module 4 creates semantic links to images of the database of which associated semantic information is strong in the same dimension as that one of said reduced sub-space.

The images of the database, which correspond best to the reduced sub-space, are extracted from the database. The correspondence can be formulated by a distance measure and can be implemented in various manners.

In the preferred embodiment, the correspondence is made by selecting the images of the database, of which the associated semantic information is strong in all dimensions of said reduced sub-space. If the number of images to be displayed is too high, a random selection or a ranking can be made. The distance measure may contain the notation of precision using at least one parameter that defines the relevance of the selected images with respect to the search keywords.

The module 4 is connected to a creation of image buttons module 5.

This module creates image buttons (represented by A1-A6 in FIG. 3) for the images of the database associated with the semantic information of said reduced sub-space.

The image button creation module 5 is connected to a graphical user interface 6. This graphical user interface 6 is in charge of displaying the image buttons on the display 7. The display 7 can also display the initial set of images. The initial set of images and the image buttons can be displayed on the same window of the display 7.

In a best embodiment, both the initial set and the image buttons can be displayed simultaneously. In this case, the selection of image buttons is automatic and the user does not interact on the selection of images.

In another embodiment, the graphical user interface replaces the initial set of images by the image buttons.

The image buttons offer a browsing option for images of the database of which associated semantic information is strong in the same dimension as that one associated with the image button.

The user can select one of the image button, for instance by a simple mouse click. Then the images of the database of which associated semantic information is strong in the same dimension as that one associated with the image button are displayed.

Such an embodiment of the invention can offer the possibility to the user to browse images in a free manner, without a precise goal, as the device can completely automatically do the control without the need for the user to enter any parameters.

Figure 2:
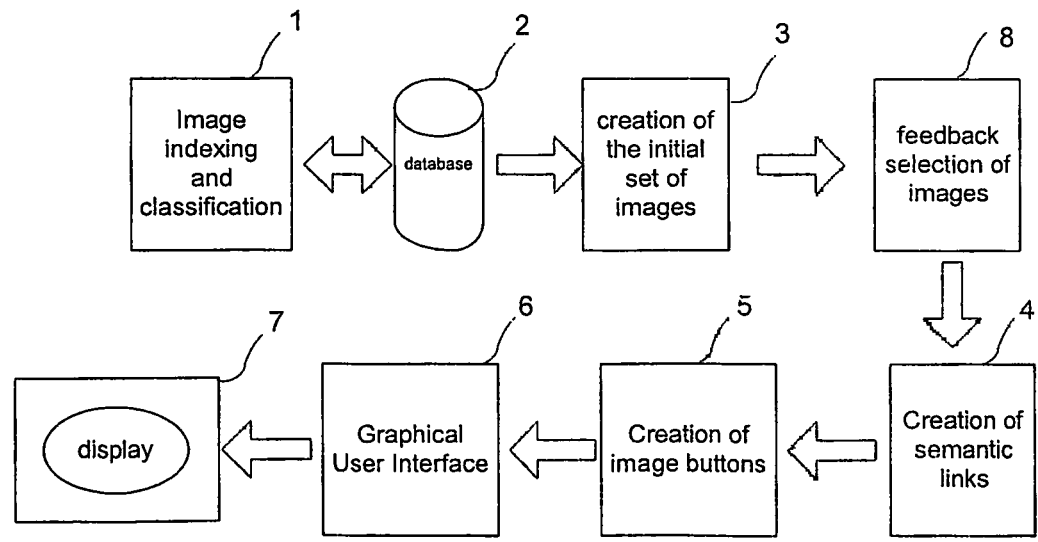
FIG. 2 represents a system implementing another embodiment of the invention.

On FIG. 2, another embodiment of the invention is represented.

Such an embodiment enables the user to make a feedback selection of the themes he wants to display by selecting some of the images of the initial set of images.

A module 8 of feedback selection of images enables the user to select some of the images of the initial set of images in order to give some criterion to select a reduced sub-space. The user selects the image simply by clicking on the image instead of entering keywords; this simplifies the usage of the system.

In existing relevance feedback systems, image search is formulated by visual similarity using measures of color, texture image layout or shape. In this invention, the search is based on textural metadata as for instance the words "people" or "mountain". The use of textural metadata can reduce drastically the computational cost of search formulation and retrieval.

Such a selection can enable the user to select some images associated with themes that he would like to display among the images of the initial set of images.

For instance, the initial set of images can consist in a picture representing a mountain, another representing a person, another representing a swimming pool, another representing a baby, another representing a person playing golf in the mountain.

If the user selects, among those images, the baby and the person playing golf, then the reduced sub-space of images will consist in persons for instance. The selection is based on semantic information and is done easily in selecting the images. A reduced sub-space is created based on the semantic information associated with the selected images using for instance the technique of cluster analysis as previously described.

If the user selects, among those images, the picture representing the mountain and the picture representing the person playing golf, then the reduced sub-space will consist in displaying people at the mountain for instance.

Figure 3:
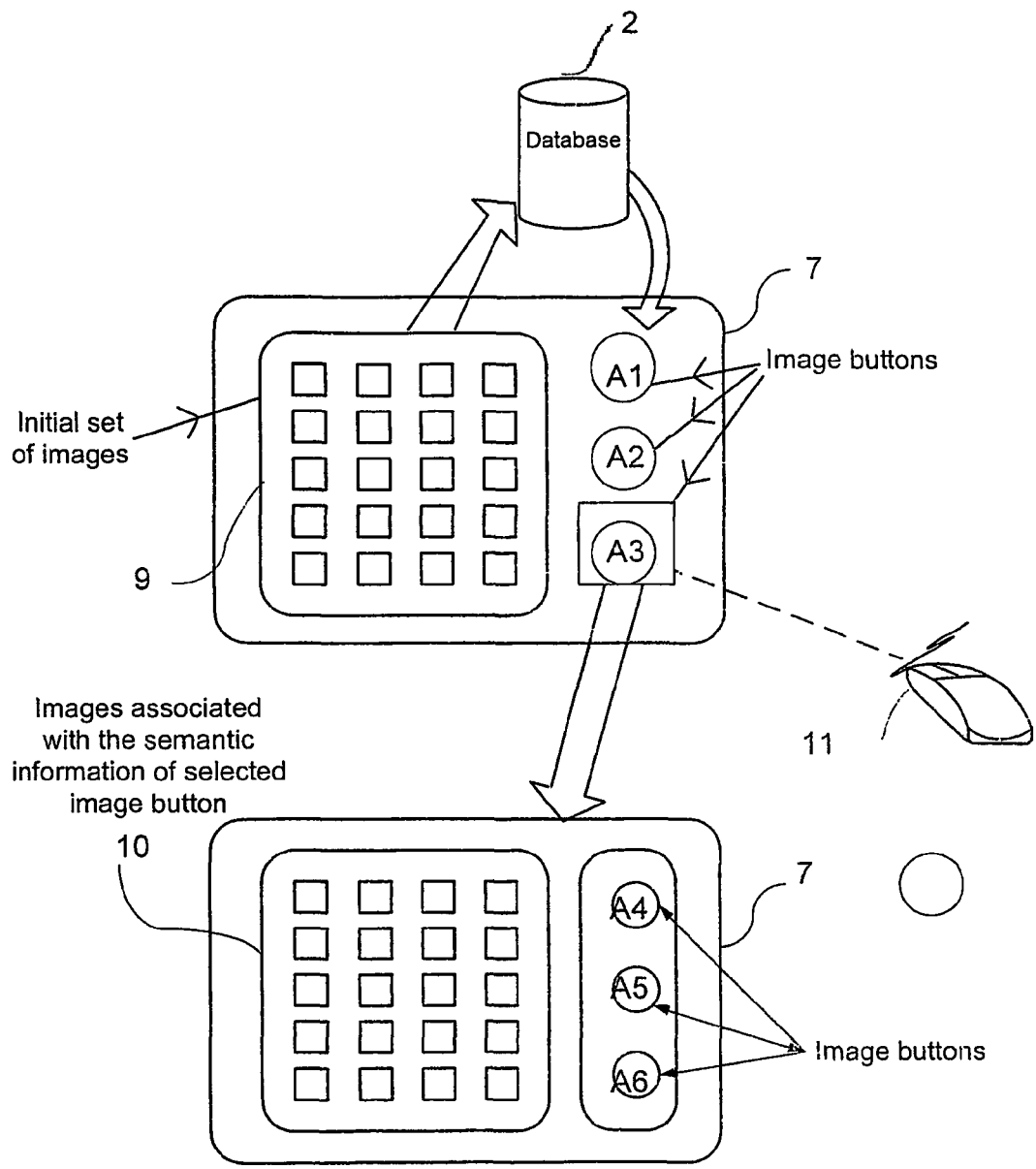
FIG. 3 represents an example of a display showing a graphical user interface implementing an embodiment of the invention.

On FIG. 3, an embodiment of a display 7 is represented.

Above part of FIG. 3 represents the first picture to be displayed on display 7 as represented.

When selecting one of the image button A1, A2 or A3, the below part of FIG. 3 is displayed on display 7 as represented.

The initial set 9 of images is displayed on display 7 as well as a series of image buttons A1, A2, A3.

The number of images and the number of image buttons is illustrative and not exhaustive.

In a first embodiment of the invention corresponding to FIG. 1, the image buttons A1, A2, A3 are displayed immediately when the initial set of images is created.

The user can then select one of the image buttons A1, A2, A3 with the help of a user interface, represented here by a mouse 11.

When the user selects the image button A3, a new content 10 is displayed on display 7 as shown on the below part of FIG. 3.

A new set 10 of images is displayed on display 7, these images being the images of the database of which associated semantic information is strong in the same dimension as that one associated with the image button A3 are displayed.

New image buttons A4, A5, A6 are also created; they represent the semantic information associated with the reduced sub-space generated from the set 10 of images. Thus, the user can iteratively get a new set of images and the associated image buttons.

These images can be ordered according to different criteria, randomly, according to particular themes, according to user's wishes.

Other buttons can exist on the display 7, such as selection of video, selection of still images, indication of a theme.

The invention claimed is:

1. Device for creating semantic browsing options comprising:
    an input device configured to receive data on a communication link;
    a means to select and display an initial set of images from an input database comprising a plurality of images, said images received through said communication link, each image being associated with a semantic information out of a semantic information space, each dimension of said space being associated with one semantic information, wherein said semantic information includes text-based data that characterizes said each image;
    a means to determine a semantic information sub-space which dimensions are each associated with one of the plurality of semantic information associated with said initial set of images, wherein the device further comprises:
    a means to select a reduced sub-space out of said semantic information sub-space absent explicitly providing a search keyword;
    a means to create semantic links to images of the database associated with the semantic information of said reduced sub-space;
    a means to display, together with said initial set of images, in the form of image buttons, images of the database associated each with one of the semantic information of said reduced sub-space;
    a means to select one of said displayed image button, triggering the display of another set of images and a new set of image buttons, said new set of images being associated with a new reduced sub-space which dimensions comprise at least one dimension associated with one semantic information associated with said image, replacing the initial set of images and enabling an iterative browsing of the input database, the new set of image buttons being each associated with one of the semantic information of the new reduced sub-space, wherein the iterative browsing is without a precise image goal and is enabled absent explicitly providing a search keyword.

2. Device according to claim 1 wherein the means to select an initial set of images can be chosen among:
    a fixed burned-in selection;
    a random selection;
    a systematic selection representing the database content;
    an interactive selection using a graphical user interface;
    a selection that considers a user profile.

3. Device according to claim 1 wherein the input database is chosen among a set of still images, a set of images extracted from at least one video sequence, and a set of images received through said communication link.

4. Device according to claim 1, wherein the means to select a reduced sub-space out of said semantic information sub-space are intended to select said reduced sub-space according to a predetermined criterion.

5. Device according to claim 4 wherein the means to select a reduced sub-space out of said semantic information sub-space are intended to select said reduced sub-space according to a predetermined criterion chosen according to a user profile.

6. Device according to claim 4, wherein said means to select a reduced sub-space out of said semantic information sub-space are intended to modify said predetermined criterion upon interaction of a user.

7. Device according to claim 6 wherein the user interaction consists in selecting at least one of the images of the initial set of images and in that the means to select a reduced sub-space select a reduced sub-space represented by the semantic information associated with said selected images.

8. Device according to claim 6 wherein the user interaction consists in selecting at least one of the images of the initial set of images and in that the means are intended to select a reduced sub-space represented by the semantic information associated with the initial set of images minus the semantic information associated with the selected images.

9. Device according to claim 1, wherein the means to select a reduced sub-space out of said semantic information sub-space are intended to select said reduced sub-space by a method selected out of a cluster analysis, a principal component analysis and an histogram analysis of the semantic information of said semantic information sub-space.

10. Device according to claim 1, wherein entities chosen among labels of semantic classes, words and word combinations define the semantic information space.

11. Device according to claim 1, wherein the reduced sub-space contains at least one dimension of said semantic information sub-space, said device comprises
   means to choose at least one of the dimensions of said semantic information sub-space;
   means to select for each chosen dimension at least one image of the database where the associated semantic information of this image is strong in the chosen dimension.

12. Device according to claim 11 wherein the means to select a reduced sub-space out of said semantic information sub-space are intended to use a graph that contains semantic links between the dimensions of the semantic information space.

13. Device according to claim 11, wherein
   the means to display at least one image of the database associated with the semantic information of said reduced sub-space are intended to display the images in the form of image buttons, where the selection of each image button offers a browsing option for images of the database of which associated semantic information is strong in the same dimension as that one associated with the image button.

14. Device according to claim 1, wherein the selected initial set of images and the images of the database associated with the semantic information of said reduced sub-space are displayed simultaneously using at least two windows of a display.

15. Method for creating semantic browsing options comprising the steps of:
   selecting and displaying an initial set of images from an input database comprising a plurality of images, each image being associated with a semantic information out of a semantic information space, each dimension of said space being associated with one semantic information, wherein said semantic information includes text-based data that characterizes said each image;
   determining a semantic information sub-space which dimensions are each associated with one of the plurality of semantic information associated with said initial set of images, wherein the method further comprises the steps of:
   selecting a reduced sub-space out of said semantic information sub-space absent explicitly providing a search keyword;
   creating semantic links to images of the database associated with the semantic information of said reduced sub-space;
   displaying in the form of image buttons, together with said initial set of images, images of the database associated with each one of the semantic information of said reduced sub-space;
   selecting one of said displayed image buttons, triggering the display of another set of images and of a new set of image buttons, said new set of images being associated with a new reduced sub-space which dimensions comprise at least one dimension associated with one semantic information associated with said image, replacing the initial set of images and enabling an iterative browsing of the input database, the new set of image buttons being each associated with one of the semantic information of the new reduced sub-space, wherein the iterative browsing is without a precise image goal and is enabled absent explicitly providing a search keyword.

16. The method of claim 15 comprising program instructions for executing the steps of the method for creating semantic browsing options, when said program is loaded on a computer.

* * * * *